UNITED STATES PATENT OFFICE.

MARK S. FOOTE, OF BURLINGTON, IOWA.

IMPROVEMENT IN FLUXES FOR REDUCING ORES.

Specification forming part of Letters Patent No. 148,556, dated March 17, 1874; application filed November 10, 1873.

*To all whom it may concern:*

Be it known that I, MARK S. FOOTE, of Burlington, in the county of Des Moines and State of Iowa, have invented certain new and useful Improvements in Fluxes for Reducing Ores, Purifying and Welding Metals, &c.; and I do hereby declare the following to be a full, clear, and exact description of the invention, such as will enable others skilled in the art to which it pertains to make and use it.

My invention relates to a flux produced directly by the action of heat alone in a cupola or other furnace, and composed of certain specified ingredients, as hereinafter more fully set forth.

I put into a cupola, blast-furnace, retort, open-hearth furnace, or any other kind of furnace where heat can be used, of iron ore, one hundred pounds; of coke, eighty pounds; of limestone, twenty pounds; and of fire-clay or broken crockery, five pounds. Then, by the direct action of heat, I produce a flux which will weld iron to steel, or steel to steel, and which, put into a reverberatory furnace with iron, will purify and cleanse the iron of sulphur, phosphorus, and other impurities.

I introduce this flux, with iron ore, into the reverberatory furnace or the bloom-forge, in the proportion of four to ten parts of flux to one hundred parts of iron, and find that it will cleanse or purify the iron of sulphur, phosphorus, and other ingredients calculated to injure it, and that its use will increase the malleability and tensile strength of the iron. I have discovered, also, that this flux, from and by reason of the silicon and aluminum which it contains, as verified by analysis, will purify and change the character of copper, or any of the baser metals whose melting-point is not below that of the flux itself, which is much below the melting-point of iron.

By my invention or discovery, I obtain a purification of metals at small expense, and available at any point, which will much facilitate the working and manufacture of metals, especially of iron and steel. I find, also, that I can take the refuse matter or slag that runs from melting ores, and by mixing with this slag suitable quantities of fire-clay or broken crockery and limestone, there will be obtained a flux that can be used in the same manner and for the same purpose as set forth above, the active principles being silicon and aluminum.

Having thus fully described my invention, what I claim as new, and desire to secure by Letters Patent, is—

A flux produced by heat alone from a combination of iron ore, coke, limestone, and fire-clay or broken crockery, in the proportions and substantially as and for the purposes described.

In testimony that I claim the foregoing I have hereunto set my hand.

MARK S. FOOTE.

Witnesses:
 CURTIS D. BIRD,
 SAM. W. SNOW.